(12) United States Patent
Iwao

(10) Patent No.: US 11,328,477 B2
(45) Date of Patent: May 10, 2022

(54) IMAGE PROCESSING APPARATUS, IMAGE PROCESSING METHOD AND STORAGE MEDIUM

(71) Applicant: CANON KABUSHIKI KAISHA, Tokyo (JP)

(72) Inventor: Tomoyori Iwao, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1 day.

(21) Appl. No.: 15/931,014

(22) Filed: May 13, 2020

(65) Prior Publication Data

US 2020/0364933 A1 Nov. 19, 2020

(30) Foreign Application Priority Data

May 16, 2019 (JP) .............................. JP2019-092824

(51) Int. Cl.
*G06T 17/10* (2006.01)
*G06T 7/55* (2017.01)

(52) U.S. Cl.
CPC ................ *G06T 17/10* (2013.01); *G06T 7/55* (2017.01)

(58) Field of Classification Search
None
See application file for complete search history.

(56) References Cited

U.S. PATENT DOCUMENTS

| | | | |
|---|---|---|---|
| 7,830,373 B1 * | 11/2010 | Gao ........................ | G06T 17/20 345/419 |
| 10,579,890 B2 * | 3/2020 | Polidor ................ | G06K 9/4609 |
| 2001/0043236 A1 * | 11/2001 | Yamamoto .............. | G06T 19/20 715/781 |
| 2016/0155262 A1 * | 6/2016 | Chen .................. | G06K 9/00369 345/426 |

FOREIGN PATENT DOCUMENTS

| | | | | |
|---|---|---|---|---|
| GB | 2253772 A | * | 9/1992 | ............. G06F 30/15 |
| JP | 2000259855 A | | 9/2000 | |

\* cited by examiner

*Primary Examiner* — James A Thompson
(74) *Attorney, Agent, or Firm* — Carter, DeLuca & Farrell LLP

(57) ABSTRACT

The image processing apparatus includes: a shape generation unit configured to generate data indicating a schematic shape of an object; a shape decomposition unit configured to decompose the data indicating the schematic shape of the object into a plurality of pieces of partial data in accordance with a shape of a cross section of the schematic shape of the object; and a shape fitting unit configured to fit a corresponding basic shape for each piece of the partial data, and generates three-dimensional shape data on the object based on the fitted basic shape.

14 Claims, 8 Drawing Sheets

STEP.3-1
ARRANGE CAMERAS AND
PERFORM IMAGE CAPTURING

STEP.3-2
GENERATE
SCHEMATIC SHAPE

STEP.3-3
DECOMPOSE
SCHEMATIC SHAPE

STEP.3-4
FIT BASIC SHAPE

IMAGE PROCESSING APPARATUS, IMAGE PROCESSING METHOD AND STORAGE MEDIUM

BACKGROUND

Field

The present disclosure relates to a technique to generate three-dimensional shape data on an object.

Description of the Related Art

In recent years, a demand to generate a three-dimensional computer graphics (hereinafter, referred to as CG) model with high reality is increasing for the use of VR (Virtual Reality), AR (Augmented Reality), street viewing, and the like. Note that, in a case where a CG creator generates a three-dimensional CG model of an object in the real space from the beginning, the load thereof is heavy and much time is required.

Consequently, a method has been proposed, which reduces the load of generation of a three-dimensional CG model and reduces the generation time by estimating the rough three-dimensional shape of an object in the real space and taking it into a CG space and generating a more accurate three-dimensional CG model by using the estimated three-dimensional shape. Japanese Patent Laid-open No. 2000-259855 has proposed a method of fitting a basic shape whose matching degree is high by a user manually specifying vertexes and sides of an object for a plurality of images obtained by capturing an object in the real space and comparing the specified information and the orientation information on the basic shape, which is stored in advance.

SUMMARY

Note that, with the method proposed in Japanese Patent Laid-open No. 2000-259855, a plurality of manual inputs of a user is required, and therefore, there is such a problem that a burden is imposed on the user.

The present disclosure provides a technique to generate three-dimensional shape data as well as reducing a burden on a user.

The present disclosure is an image processing apparatus including: a first generation unit configured to generate data indicating a schematic shape of an object; a decomposition unit configured to decompose the data indicating the schematic shape of the object into a plurality of pieces of partial data in accordance with a shape of a cross section of the schematic shape of the object; a fitting unit configured to fit a corresponding basic shape for each piece of the partial data; and a second generation unit configured to generate three-dimensional shape data on the object based on the fitted basic shape.

Further features of the present disclosure will become apparent from the following description of exemplary embodiments with reference to the attached drawings.

DESCRIPTION OF THE EMBODIMENTS

In the following, an embodiment of the present disclosure is explained with reference to the drawings. The following embodiment is not intended to limit the present disclosure and all combinations of features explained in the present embodiment are not necessarily indispensable to the solution of the present disclosure.

In the present embodiment, three-dimensional shape data on an object is generated by decomposing the schematic shape of the object into a combination of basic shapes and fitting the basic shape to the decomposed schematic shape of the object. Further, explanation is given by using, as an example, a rugby goal whose shape structure is simple as the object.

Figure 1:
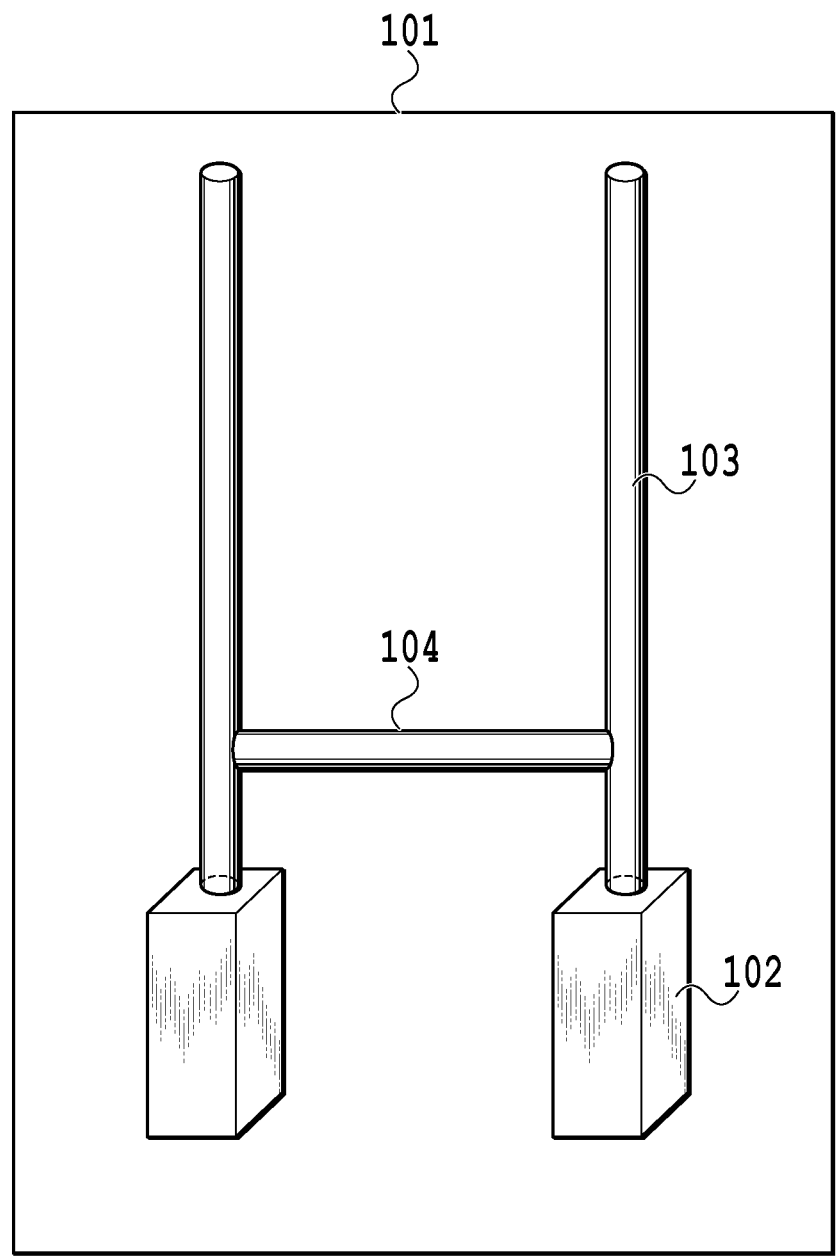
FIG. 1 is a diagram showing a three-dimensional shape of a rugby goal.

FIG. 1 is a diagram showing the three-dimensional shape of a rugby goal. As shown in FIG. 1, the shape of a rugby goal 101 generally includes two cuboid cushions 102, which are the foundations, two goal posts 103, and a cross bar 104. As described above, the rugby goal is an example of the object and the object is not necessarily limited to this and it is possible to apply the present embodiment to an object that can be represented by a combination of basic shapes, for example, such as a construction and a vehicle.

Figure 2:
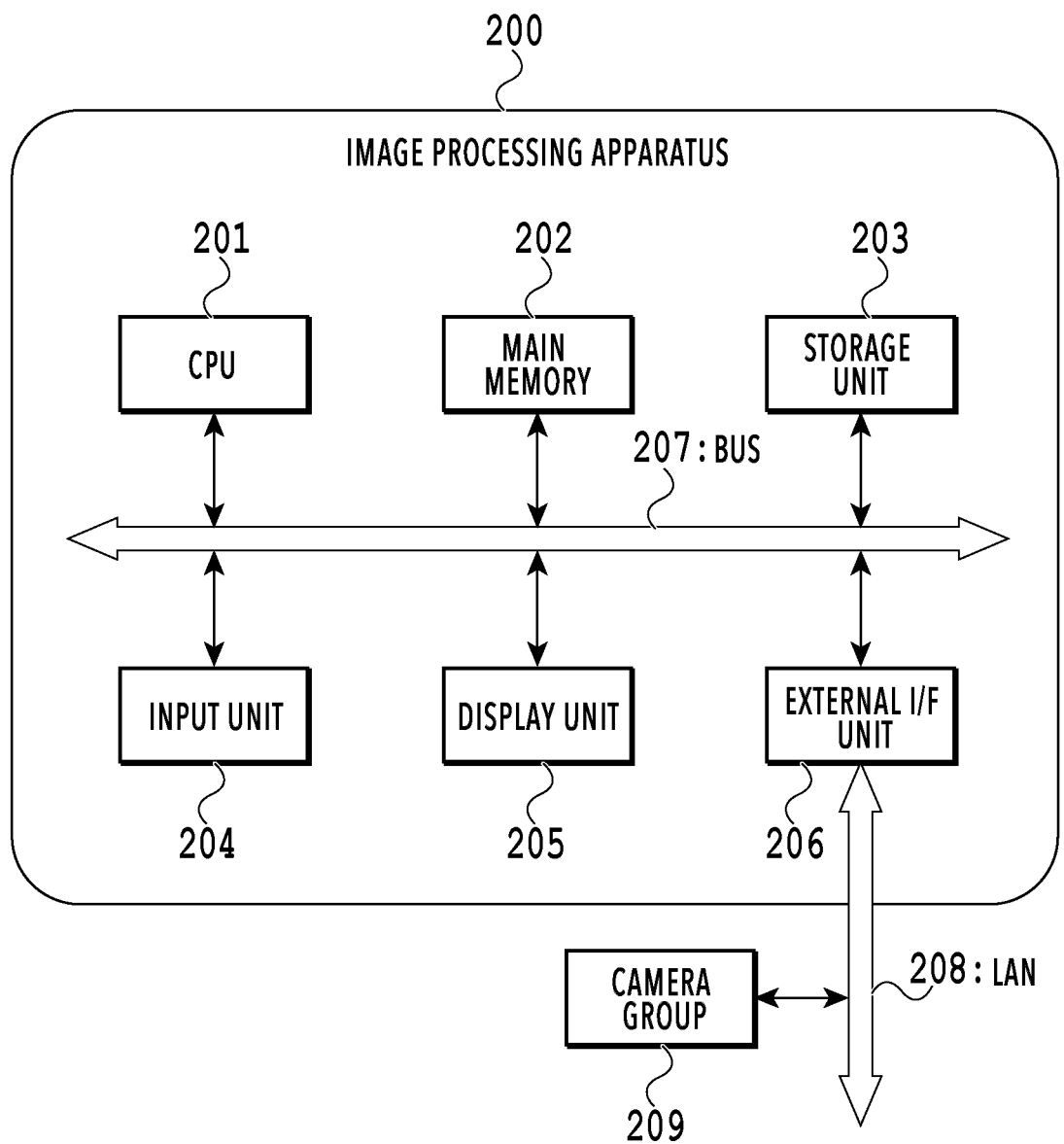
FIG. 2 is a diagram showing a hardware configuration of a three-dimensional shape data generation system.

FIG. 2 is a diagram showing the hardware configuration of a three-dimensional shape data generation system. As shown in FIG. 2, the three-dimensional shape data generation system comprises an image processing apparatus 200 and one or more image capturing apparatuses (camera group) 209. The image processing apparatus 200 comprises a CPU 201, a main memory 202, a storage unit 203, an input unit 204, a display unit 205, and an external I/F unit 206 and each unit is connected via a bus 207.

The CPU (Central Processing Unit) 201 is a central processing unit and centralizedly controls the image processing apparatus 200 by executing various programs stored in the storage unit 203 and the like. The main memory 202 temporarily stores data, parameters, and the like, which are used in various kinds of processing and in addition thereto, provides a work area to the CPU 201. The storage unit 203 is a large-capacity storage device storing various programs and various kinds of data necessary for a GUI (Graphical User Interface) display and for example, a nonvolatile memory, such as a hard disk and a silicon disk.

The input unit 204 is an input device, such as a keyboard, a mouse, an electronic pen, and a touch panel, and receives an operation input from a user. The display unit 205 comprises a liquid crystal panel and the like and for example, produces a GUI display of analysis results, and so on. The external I/F unit 206 is connected with each camera configuring the camera group 209 via a LAN (Local Area Network) 208 and performs transmission and reception of video image data and control signal data. The bus 207 connects each unit described above and performs data transfer.

The camera group 209 is connected with the image processing apparatus 200 via the LAN 208 and based on control signals from the image processing apparatus 200, starts and stops image capturing, changes camera settings (for example, shutter speed, aperture, and the like), transfers captured video image data, and so on. Although the three-dimensional shape data generation system comprises various components other than the components shown in FIG. 2 as the hardware configuration thereof, explanation thereof is omitted here.

Figure 3:
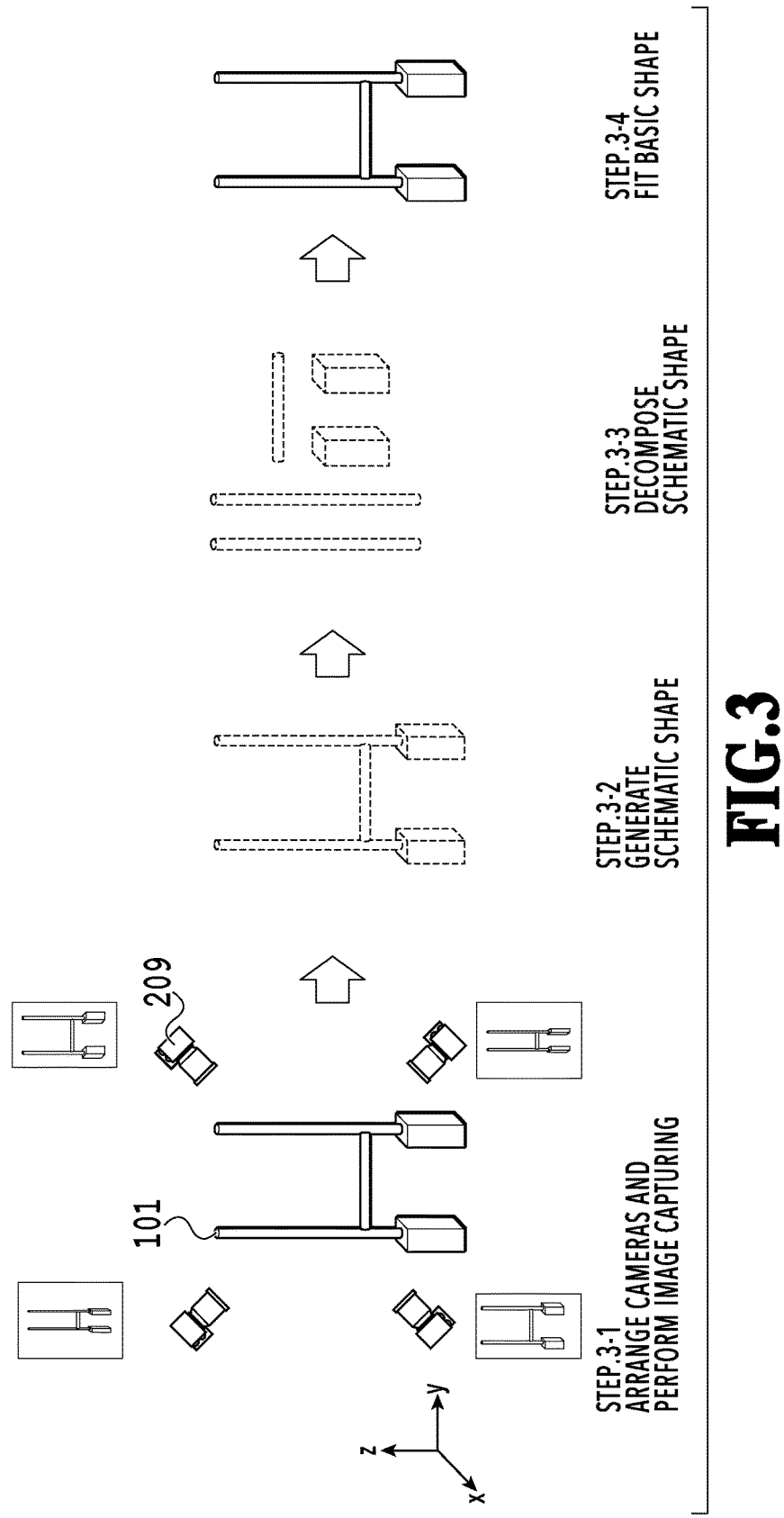
FIG. 3 is a conceptual diagram of processing in the three-dimensional shape data generation system.

FIG. 3 is a conceptual diagram of processing in the three-dimensional shape data generation system. In the present embodiment, first, as at STEP. 3-1, cameras are arranged so as to surround an object and the object is captured by the installed cameras. For each individual camera configuring the camera group 209, the orientation of the camera, the focal distance, the exposure control parameter, and the like are set appropriately so that the rugby goal 101 is included within the viewing angle.

Next, at STEP. 3-2, the image processing apparatus 200 calculates (generates) the schematic shape of the object from the captured images as data. Further, at STEP. 3-3, the image processing apparatus 200 decomposes the schematic shape so that the schematic shape can be represented by a combination of basic shapes (to be more accurate, the data indicating the schematic shape is decomposed into a plurality of pieces of partial data). Here, the basic shape refers to the shape (processing unit) minimum necessary for generating three-dimensional shape data on an object, such as cuboid, sphere, triangular prism, cylinder, triangular pyramid, and cone. Then, at STEP. 3-4, the image processing apparatus 200 fits the basic shape for each decomposed schematic shape (for each piece of partial data) and outputs final three-dimensional shape data.

Figure 4:
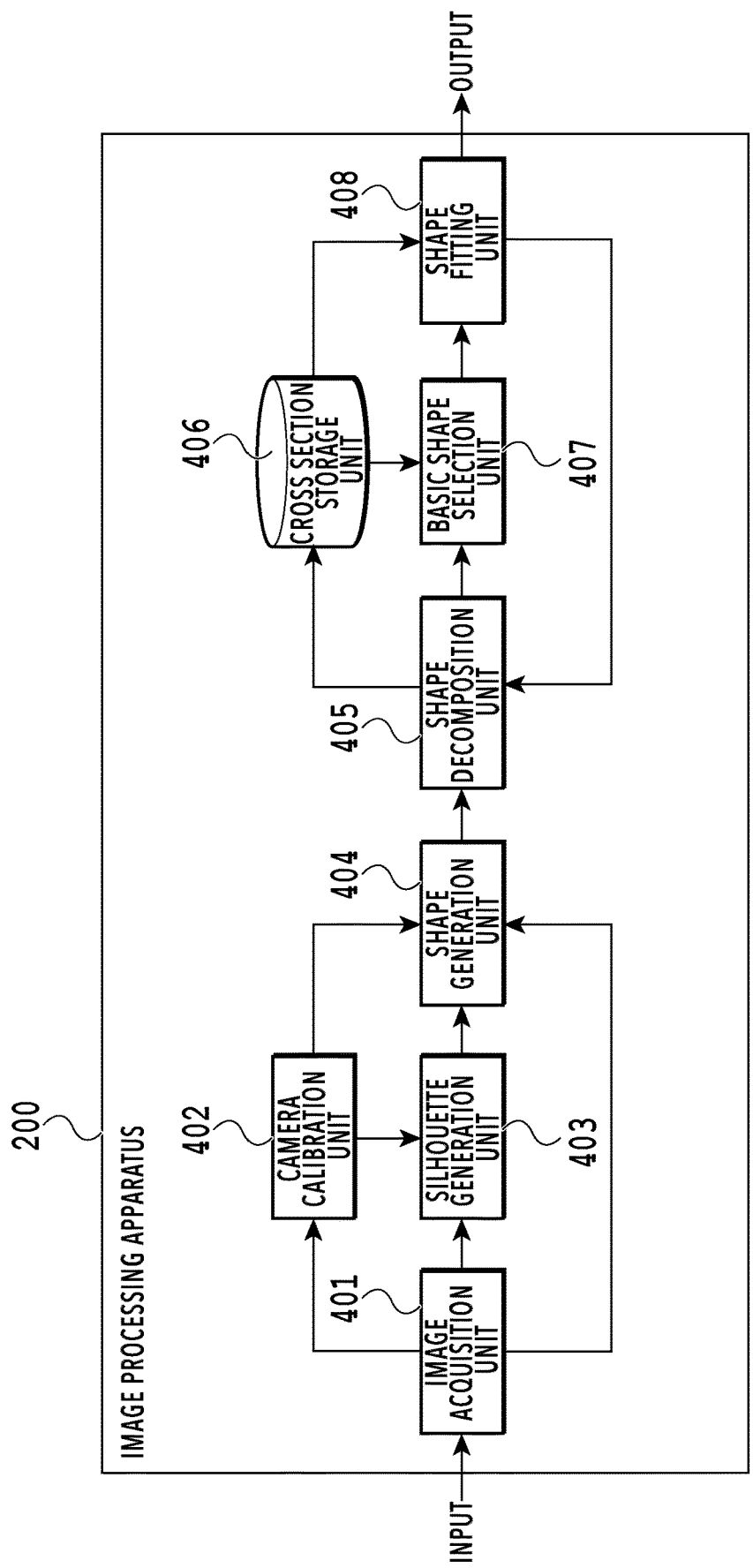
FIG. 4 is a block diagram showing a functional configuration of an image processing apparatus.

FIG. 4 is a block diagram showing the functional configuration of the image processing apparatus 200. As described above, in the present embodiment, the three-dimensional shape data on the rugby goal 101 is generated by the image processing apparatus 200. The image processing apparatus 200 comprises an image acquisition unit 401, a camera calibration unit 402, a silhouette generation unit 403, a shape generation unit 404, a shape decomposition unit 405, a cross section storage unit 406, a basic shape selection unit 407, and a shape fitting unit 408.

The image acquisition unit 401 acquires images captured by the camera group 209 as an image group. The camera calibration unit 402 performs camera calibration from the captured images and calculates extrinsic parameters, intrinsic parameters, and distortion parameters, respectively, of the cameras. The silhouette generation unit 403 extracts (generates) a silhouette of an object from the captured image. Here, the silhouette is an image that masks the area of the object that is the shape estimation target within the captured image.

The shape generation unit 404 calculates (generates) the schematic shape of an object as data based on the silhouette of the object within the image and the calculated camera parameters. In the present embodiment, as a method of calculating the schematic shape of an object from the silhouette of the object, the Visual Hull method (hereinafter, referred to as VH method) is used. Details of the VH method will be described later.

The shape decomposition unit 405 decomposes the schematic shape of an object generated by the shape generation unit 404 into a plurality of shapes (that is, a plurality of pieces of partial data) in order to perform fitting with basic shapes. The cross section storage unit 406 stores cross-sectional views of the three-dimensional CG shapes, such as cuboid, sphere, triangular prism, cylinder, triangular pyramid, and cone, which are prepared in advance. The basic shape selection unit 407 selects which basic shape is fitted for each decomposed shape. The shape fitting unit 408 fits the basic shapes and generates three-dimensional shape data on the object by determining the centroid and the scale of the basic shape for each decomposed shape. Further, the shape fitting unit 408 determines whether or not the fitting has been performed accurately.

Figure 5:
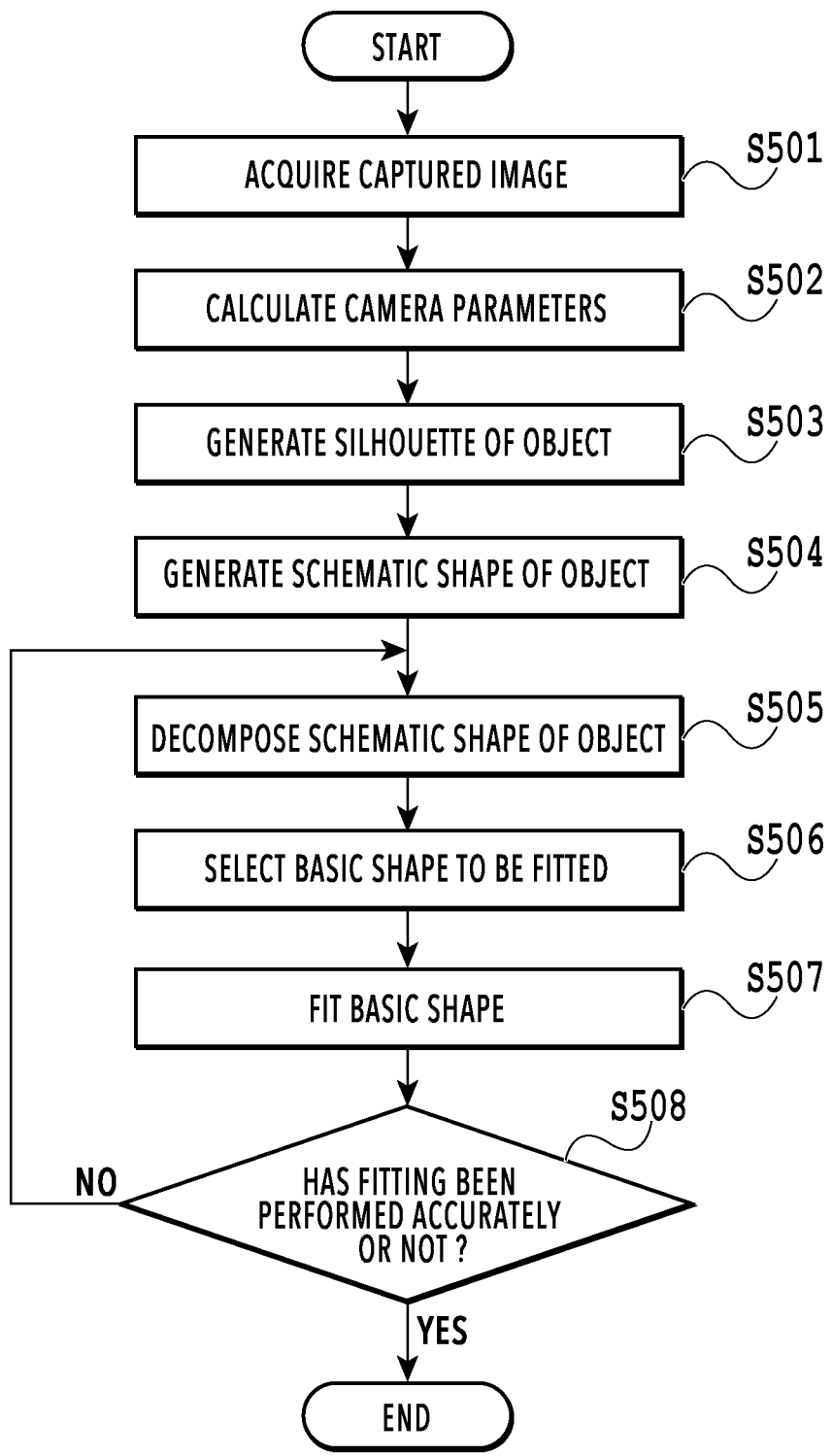
FIG. 5 is a flowchart showing a procedure of processing performed in the image processing apparatus.

Next, by using the flowchart in FIG. 5, the procedure of the processing performed in the image processing apparatus 200 is explained. The processing shown in this flowchart is implemented by the CPU 201 reading a predetermined program from the storage unit 203, loading the program onto the main memory 202, and executing the program. Further, symbol "S" in the explanation of the flowchart represents a step.

At S501, the image acquisition unit 401 transmits image capturing instructions to the camera group 209 via the LAN 208. The image captured by the camera group 209 is read into the main memory via the LAN 208, the external I/F unit 206, and the bus 207.

At S502, the camera calibration unit 402 calculates the camera parameters of each camera configuring the camera group 209 from the images acquired by the image acquisition unit 401. The camera parameters are calculated by camera calibration processing that takes a plurality of images whose image capturing positions of the cameras are different as an input.

In the following, the camera calibration processing is explained briefly. First, a plane pattern, such as a square grid, is captured from multiple viewpoints (a plurality of viewpoint positions). Next, from the images obtained by capturing the plane pattern, such as a square grid, a feature point (here, an intersection of straight lines) is detected and the coordinates of the feature point in the image coordinate system are calculated. Then, by using the calculated coordinates of the feature point, initial values of the intrinsic parameters of the camera are calculated. Here, the intrinsic parameters of the camera refer to parameters indicating the focal length and the optical center referred to as the principal point. Further, it is not necessarily required to calculate the initial values of the intrinsic parameters of the camera from the feature point of the image and for example, it is also possible to use design values of the camera.

After calculating the initial values of the intrinsic parameters of the camera, by nonlinear optimization processing referred to as bundle adjustment, the intrinsic parameters, the extrinsic parameters, and the distortion parameters of the camera are calculated. Here, the extrinsic parameters of the camera refer to parameters indicating the position of the camera, the line-of-sight direction, and the rotation angle with the line-of-sight direction being taken as an axis. Further, the distortion parameters refers to coefficients indicating a distortion of an image in the radial direction, which is caused by a difference in refractive index between lenses, and a distortion in the circumferential direction, which is caused by the lens and the image plane not being parallel. As a supplement, although it is possible to use a method other than the above-described method as the method of the camera calibration processing, explanation thereof is omitted here.

At S503, the silhouette generation unit 403 extracts (generates) a silhouette of an object from the image acquired by the image acquisition unit 401. Here, as the method of extracting a silhouette, for example, there is a background difference method or a method that uses a floor surface-projected image.

The background difference method is a method in which an image in a case where the object does not exist and an image in a case where the object exists are captured, respectively, a difference area between the images is calculated, and the difference area is taken as the silhouette of the object. Further, the method that uses a floor surface-projected image is a method in which a floor surface-projected image is generated by taking an intermediate value of the captured images projected onto the floor surface from each camera, and a silhouette is extracted by taking a difference between the image obtained by back projecting the floor surface-projected image onto each camera and the captured image. The floor surface refers to a plurality of horizontal planes (hereinafter, referred to as xy-planes) vertical to the axis (hereinafter, referred to as z-axis) in the vertical direction of the rugby goal in the present embodiment. Further, the floor surface-projected image that is generated is an image from which an object having a height is removed.

Here, the rugby goal that is used as an object is very large and much time is required for installation, and therefore, it is predicted that the background changes considerably before and after the installation thereof. Because of this, in the present embodiment, as the method of extracting a silhouette, the method that uses a floor surface-projected image is used in place of the background difference method. In the following, extraction of a silhouette by the method that uses a floor surface-projected image is explained.

In a case where floor surface projection is performed, first, in accordance with the intrinsic parameters and the distortion parameters of the camera, the distortion of the captured image of each camera is corrected. The parameters that are used for correction of the distortion of the captured image are the intrinsic parameters and the distortion parameters calculated at S502. Next, a transformation matrix between the coordinates of a floor surface and the coordinates of an image is calculated. First, a transformation matrix V that transforms the world coordinate system in which the floor surface exists into the camera coordinate system is defined. Here, the camera coordinate system is the coordinate system in which the origin of the coordinate system is taken as the start point, and the horizontal direction of an image is takes as an x-axis, the vertical direction of the image is taken as a y-axis, and the line-of-sight direction is taken as a negative direction of a z-axis. Further, a transformation matrix P that transforms the camera coordinate system into the screen coordinate system is defined. The transformation here (that is, transformation by the transformation matrix P) is a transformation that projects a three-dimensional object existing in the camera coordinate system onto a two-dimensional plane.

In view of those described above, it is possible to express a formula that projects homogeneous coordinates (x, y, z, w) of a point X on the floor surface onto homogeneous coordinates (x', y', z', w') of a point U on the image as follows. That is, by using the following formula, each camera image is projected onto a height z of a certain floor surface of the rugby goal 101. In the following formal, in order to add a translation, a coordinate w and a coordinate w' are added to obtain four-dimensional coordinates.

[Mathematical formula 1]

$$U = PVX \quad (1)$$

At S504, the shape generation unit 404 generates the schematic shape of the object as data from the shape (silhouette) generated by the silhouette generation unit 403 and the camera parameters calculated by the camera calibration unit 402. In the present embodiment, as described above, as an example of the method of generating the schematic shape from the silhouette of an object, the VH method is used. Here, the VH method is a method in which a silhouette area of an object within an image is projected into a space based on the calculated camera parameters and the product set of the projected areas is defined as the schematic shape of the object.

The method of estimating (generating) the schematic shape of an object from captured images is not necessarily limited to the VH method and for example, there is a stereo matching method of estimating the schematic shape of an object by using a disparity between cameras, or the like. Further, in a case where the schematic shape of an object is estimated, it is not necessarily required to use captured images. Consequently, for example, it is also possible to use measurement results of a light wave measuring instrument. Specifically, it is also possible to estimate the schematic shape of an object by finding the distance to the object from the relationship between the time taken from emission of a laser beam until the laser beam returns to a measuring instrument and the speed of the laser beam by using the laser measuring instrument. As a supplement, although it is also possible to use a method other than the method described above as the generation method of the schematic shape data on an object, explanation thereof is omitted here.

At S505, the shape decomposition unit 405 decomposes the schematic shape of the object, which is generated by the shape generation unit 404, so that it is made possible to perform fitting by using the basic shape. In the following, the method (processing) of decomposing the schematic shape of an object is explained specifically by using FIG. 6.

Figure 6:
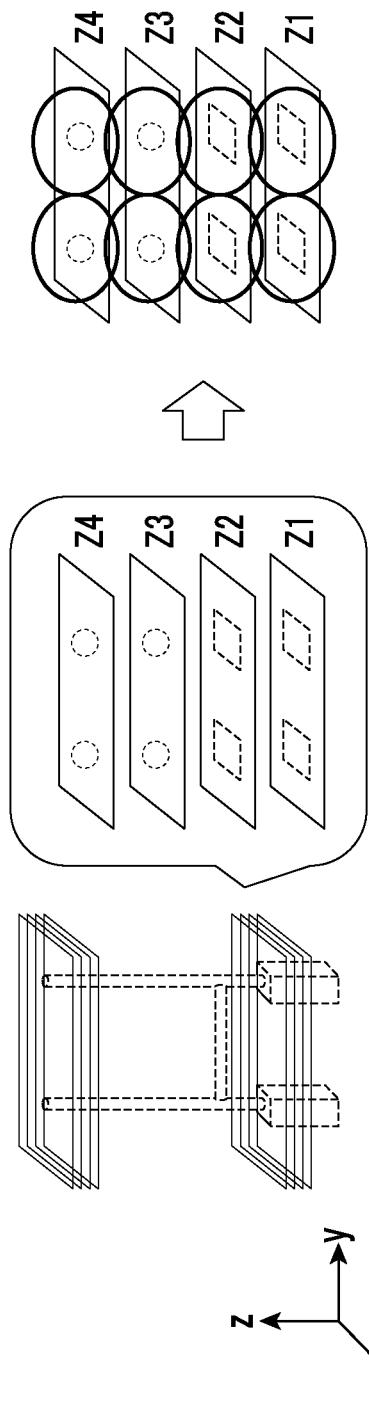
FIG. 6 is a conceptual diagram of processing to decompose a schematic shape of an object.
Figure 6:
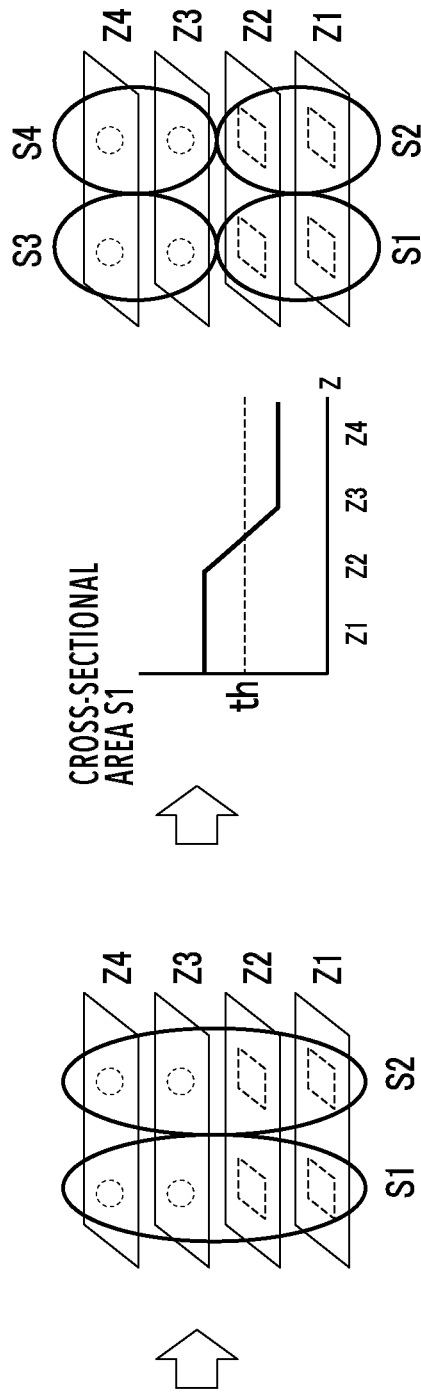

FIG. 6 is a conceptual diagram of the processing to decompose the schematic shape of an object. First, at STEP. 6-1, a cross-sectional view of an object is calculated in a direction perpendicular to the z-axis. Here, cross-sectional views z1 to z4 are those obtained by enlarging cross-sectional views of the lower portions of the goal posts and cross-sectional views of the upper portions of the foundations. The processing to decompose the schematic shape is explained by using these cross-sectional views at subsequent STEP.

Next, at STEP. 6-2, in a case where a plurality of cross sections exists in each cross-sectional view, the cross sections are divided. In the cross-sectional view at each height of z1 to z4, the cross sections are divided into two. As the method of dividing cross sections, for example, it is possible to use a method of performing division by taking connected closed areas as one cross section by taking into consideration the connectivity of certain cross sections.

Then, at STEP. 6-3, whether or not each divided cross section is connected in the z-axis direction is determined. Specifically, in a case where the height is changed from z1 to z4, on a condition that there is connectivity of the cross sections in the z-axis direction, it is determined that it is possible to fit the cross sections by one solid shape. In the example of the rugby goal shown in FIG. 6, each cross section is connected in the z-axis direction and each set of the connected cross sections is taken as S1 and S2.

Further, at STEP. 6-4, for the cross sections calculated to be fitted by one solid shape, the change in a cross-sectional area S in the z-axis direction is checked and the height at which the cross-sectional shape changes considerably is set as an inflection point of the shape. Specifically, as indicated in the following formula, a threshold value th is provided for the change in the cross-sectional area S and in a case where the cross-sectional area changes more than the threshold value, it is defined that a different shape is fitted.

[Mathematical formula 2]

$$S_i=S(z>z_h), S_j(z\leq z_h) \text{ if } |S(z_h)-S(z_{h-1})|>th \quad (2)$$

In the example of the rugby goal shown in FIG. 6, in a case where the height changes from z2 to z3, the cross-sectional area changes considerably and the set S1 of cross sections is divided into a set S1 of cross sections and a set S3 of cross sections and the set S2 of cross sections are divided into a set S2 of cross sections and a set S4 of cross sections. Further, it is not necessarily required to set the threshold value th as the difference between cross-sectional areas and as indicated in the following formula, it may also be possible to set the threshold value th as the rate of the change to the magnitude of the cross-sectional area.

[Mathematical formula 3]

$$S_i=S(z>z_h), S_j(z\leq z_h) \text{ if } S(z_{h-1})/S(z_h)>th \text{ or } S(z_h)/S(z_{h-1})>th \quad (3)$$

At S506, the basic shape selection unit 407 selects which basic shape is fitted for each decomposed shape. The basic shape selection unit 407 selects the basic shape to be fitted by comparing the cross-sectional view of the shape decomposed by the shape decomposition unit 405 and the cross-sectional view stored in the cross section storage unit 406. As described above, in the cross section storage unit 406, cross sections obtained by capturing three-dimensional CG shapes, such as cuboid, sphere, triangular prism, cylinder, a triangular pyramid, and cone, from a variety of directions are stored as cross-sectional views. In the following, the method (processing) of selecting a basic shape is explained specifically by using FIG. 7.

Figure 7:
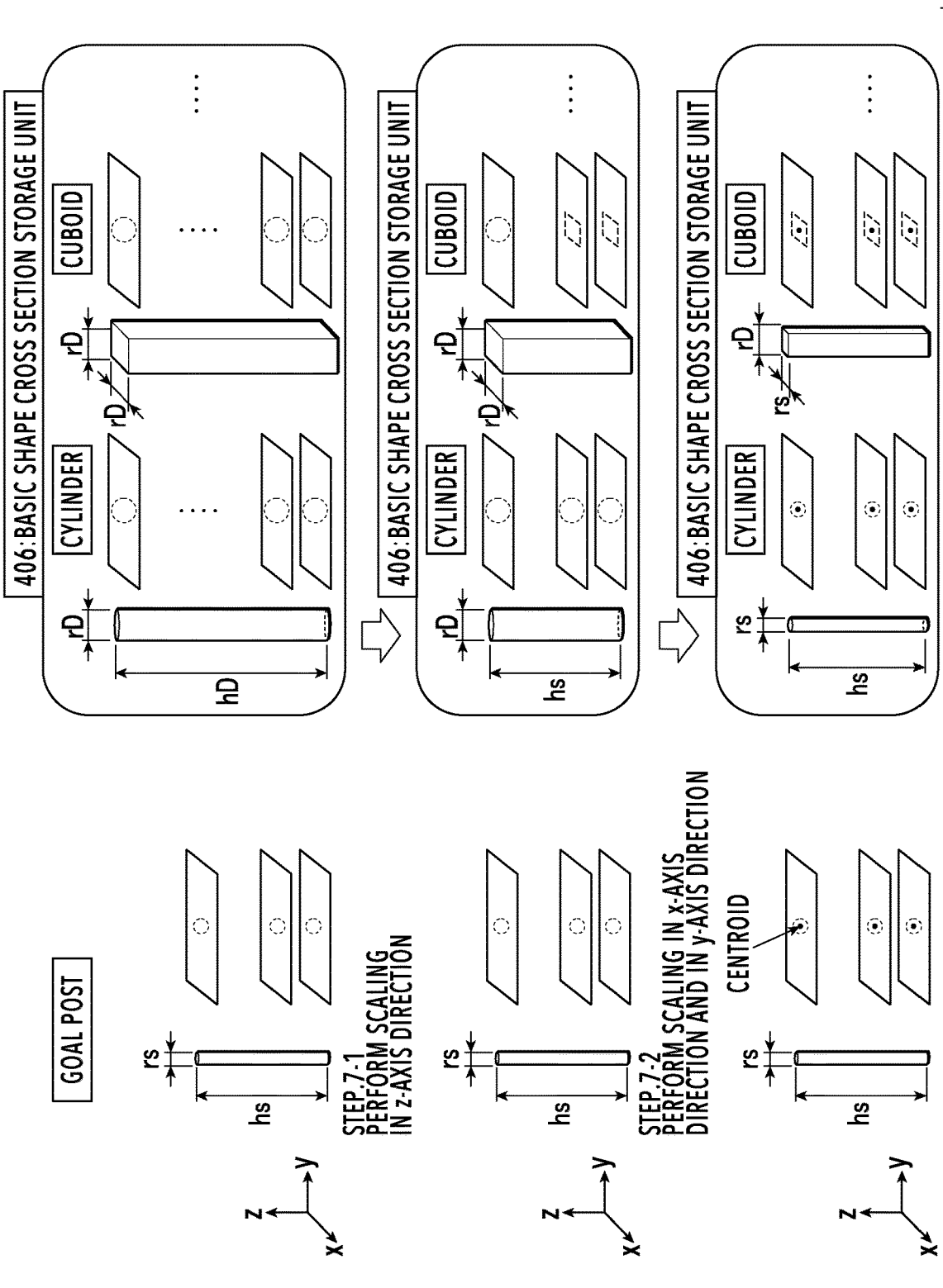
FIG. 7 is a conceptual diagram of processing to select a basic shape.

FIG. 7 is a conceptual diagram of the processing to select a basic shape. Here, an example is explained in which a cylinder is fitted to the goal post of the rugby goal. First, at STEP. 7-1, the scale of the height is made the same because the displacement in the cross-sectional area is different depending on its height between the decomposed shape and the basic shape. That is, in a case where the height of the basic shape stored in the cross section storage unit 406 is taken as $h_D$ and the height of the decomposed shape is taken as $h_s$, a correspondence between a cross-sectional area $S_S$ (h) of the decomposed shape and a cross-sectional area $S_D$ (h) of the basic shape is indicated as follows.

[Mathematical formula 4]

$$S_S(h)=S_D(h \cdot h_D/h_s) \quad (4)$$

Next, at STEP. 7-2, the scale is also made the same for the width of the shape because the cross-sectional area changes with respect to the width of the shape itself. First, one certain cross section is divided into a plurality of cross sections and from an area $S_k$ and a centroid $x_k$ of each divided cross section, a centroid $x_G$ of the entire cross section is calculated by the following formula (5).

[Mathematical formula 5]

$$x_G=\Sigma_k S_k x_k/\Sigma_k S_k \quad (5)$$

Following the above, by taking the calculated centroid as a center, the scales in the x-axis direction and in the y-axis direction are adjusted. In the example of the rugby goal shown in FIG. 7, scaling adjustment is made by making the scales of the basic shape stored in the cross section storage unit 406 $r_s/r_D$ times in the x-direction and in the y-direction.

Then, lastly, the basic shape whose degree of matching of the cross section is the highest is selected as a target that is fitted. Specifically, the difference between the cross-sectional area $S_S$ of the decomposed shape and the cross-sectional area $S_D$ of the basic shape after the scaling adjustment is compared for each height and the basic shape that makes the difference in the cross-sectional area small as a result of totalization of all the heights is selected as the target that is fitted. That is, in a case where the cross-sectional area of a basic shape n stored in the cross section storage unit 406 is taken as $S_{n,D}$, the basic shape that satisfies the following formula is selected as the target that is fitted.

[Mathematical formula 6]

$$\text{argmin } \Sigma_z|S_S(z)-S_{n,D}(z)| \quad (6)$$

In FIG. 7, although the erect basic shape is handled, cross sections in a case where image capturing is performed from a variety of directions are stored in the cross section storage unit 406 as cross-sectional areas, and therefore, a basic shape that is not erect may also be selected as the target that is fitted. Further, in a case where the comparison with all the basic shapes stored in the cross section storage unit 406 results in a very large difference (that is, the difference is too large to perform fitting), it may also be possible to output the shape obtained by decomposing the schematic shape as the final three-dimensional shape data as it is.

At S507, the shape fitting unit 408 fits the selected basic shape. The shape fitting unit 408 performs optimization so that the difference between the position of a vertex $V_S$ of the shape obtained by decomposing the schematic shape and the position of a vertex $V_D$ of the basic shape is the minimum in the fitting of the basic shape.

In a case where the optimization is performed, it is assumed that the shape fitting unit 408 selects vertexes $V_i$, s of the shape obtained by decomposing the schematic shape, which are located nearer to vertexes $V_{i,D}$ of the basic shape, as a combination of vertexes for which the difference is calculated. For example, in a case where a cylinder is fitted, an error is produced in accordance with a position G of the centroid, a radius r of the cylinder, and a height h of the cylinder, and therefore, it is necessary to calculate the position G of the centroid, the radius r of the cylinder, and the height h of the cylinder so that the following formula (7) is satisfied (that is, so that the difference in position between vertexes is the minimum).

[Mathematical formula 7]

$$\text{argmin } \rho_i\|V_{i,S}-V_{i,D}\| \quad (7)$$

At the time of performing the optimization, it is possible to easily calculate the initial position of the centroid by using the two-dimensional centroid calculated by the above formula (5) and the height of the divided shape. Further, it is possible to set the initial value of the radius based on the width of the shape for the centroid of the cross section. In addition, as regards the height of the cylinder, it is sufficient to take the height of the divided shape as the initial value. As a supplement, although it is possible to use a method other than the above-described method as the optimization method, for example, such as the steepest decent method and the Gauss-Newton method, explanation thereof is omitted here.

At S508, the shape fitting unit 408 determines whether or not the fitting has been performed accurately. Whether or not the fitting has been performed accurately is determined by calculating the difference between a shape F after the fitting has been performed and a schematic shape R. Specifically, as indicated in the following formula, in a case where the difference between the volume of the common portion of the shape after the fitting has been performed and the schematic shape and the volume of the shape after the fitting has been performed is smaller than a threshold value $V_t$h, it is determined that the fitting has been performed accurately.

[Mathematical formula 8]

$$|F \setminus (F \cap R)| < V_{th} \quad (8)$$

In the above formula (8), although the calculation of the difference between the shape F after the fitting has been performed and the schematic shape R and the threshold determination are performed for the entire schematic shape, it may also be possible to perform them for each fitted shape.

Then, in a case where it is determined that the difference between the volume of the common portion of the shape after the fitting has been performed and the schematic shape and the volume of the shape after the fitting has been performed is larger than the threshold value $V_{th}$, the processing is returned to S505 and the processing to decompose the schematic shape of the object is performed again.

In a case where the schematic shape of the object is decomposed again, the fitting of the basic shape and the threshold determination are repeated by calculating the cross section in an axial direction different from that of the previous decomposition processing, performing the processing by changing the threshold value for the change in the cross-sectional area, and so on. Further, it is not necessarily required to repeat the processing from the processing (S505) to decompose the schematic shape of the object, and it may be possible to repeat the processing from the selection of the basic shape after the decomposition of the schematic shape or from the fitting after the selection of the basic shape. Furthermore, as regards the repetition of the processing, in a case where a maximum number of times of repetition is set in advance and the difference does not converge, it may also be possible to output the schematic shape as it is as the final three-dimensional shape data.

Figure 8:
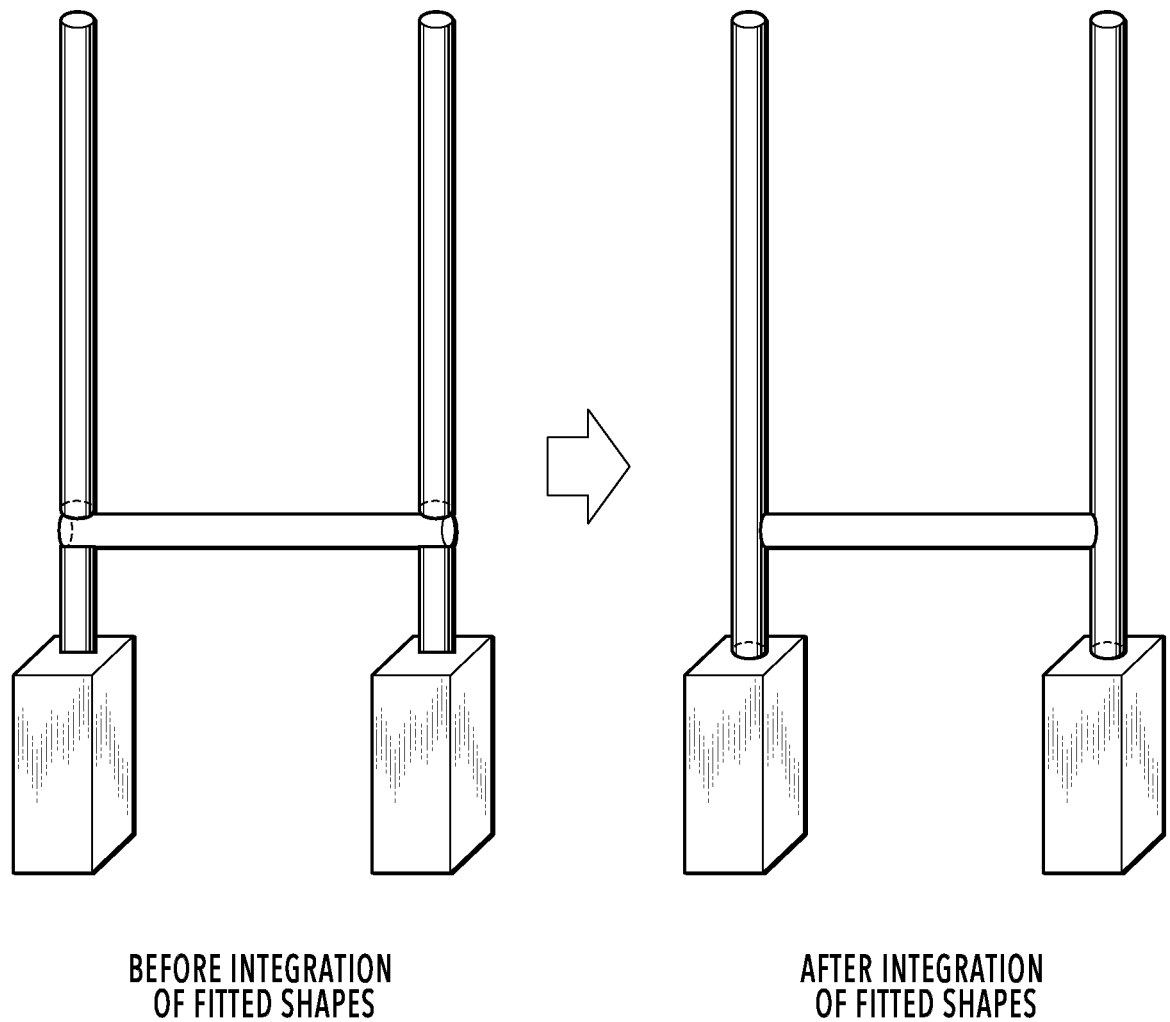
FIG. 8 is a conceptual diagram of processing to integrate shapes.

In addition, in a case of determining that the fitting has been performed accurately, the shape fitting unit 408 compares each fitted shape and in a case where there are shapes whose scale and direction are the same, integrates them into one shape as shown in FIG. 8. Further, for example, in decomposing the shape of the rugby goal, there is a case where the one goal post is divided into two depending on the threshold setting method. Consequently, each threshold value relating to the distance, the inclination, and the scale with the basic shape of the same kind is set and in a case where each difference is less than or equal to each threshold value, the shapes are integrated.

As explained above, according to the image processing apparatus of the present embodiment, it is possible to generate three-dimensional shape data as well as reducing the burden of a user.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-092824, filed May 16, 2019, which is hereby incorporated by reference wherein in its entirety.

What is claimed is:

1. An image processing apparatus comprising:
one or more memories storing instructions; and
one or more processors executing the instructions to:
generate data representing a schematic shape of an object,
divide the generated data into a plurality of pieces of partial data based on a shape of a cross section of the schematic shape of the object,
select basic shape data corresponding to the divided partial data from among a plurality of pieces of basic shape data, based on comparison of a cross section of a schematic shape of the object corresponding to the divided partial data and a cross section of a shape of each of the plurality of pieces of basic shape data, a cross-sectional view of the cross section of the shapes of the plurality of pieces of basic shape data being stored as data, the cross section of the schematic shape of the object corresponding to the divided partial data and the stored cross section of the cross-sectional view of the basic shape being compared, and the basic shape data whose degree of matching is higher than a degree of matching of other basic shape data being selected,
modify the selected basic shape data corresponding to the divided partial data, and
generate three-dimensional shape data of the object based on the modified basic shape data.

2. The image processing apparatus according to claim 1, wherein
the basic shape data is three-dimensional shape data that is taken as a processing unit in a case where three-dimensional shape data of the object is generated.

3. The image processing apparatus according to claim 1, wherein
the basic shape data includes data representing at least one of cuboid, sphere, triangular prism, cylinder, triangular pyramid, and cone.

4. The image processing apparatus according to claim 1, wherein
the three-dimensional shape data of the object is generated by integrating the modified basic shape data.

5. The image processing apparatus according to claim 1, wherein
the data representing the schematic shape of the object is generated by using a plurality of captured images.

6. The image processing apparatus according to claim 1, wherein
the data representing the schematic shape of the object is generated by using measurement results of a light wave measuring instrument.

7. The image processing apparatus according to claim 1, wherein
the generated data is divided into the plurality of pieces of partial data based on connectivity of a cross section of the schematic shape of the object and a change in cross-sectional area of the schematic shape of the object.

8. The image processing apparatus according to claim 1, wherein
in a case of comparing the cross section of the schematic shape of the object corresponding to the divided partial data and the stored cross section of the cross-sectional view of the basic shape, a scale of the basic shape is adjusted based on a relationship between a height of a schematic shape of an object corresponding to the divided partial data and a height of the basic shape and a relationship between a centroid of a cross section of the schematic shape of the object corresponding to the divided partial data and a centroid of a cross section of the basic shape.

9. The image processing apparatus according to claim 1, wherein
the basic shape is selected so that a difference between a position of a vertex forming the data representing the schematic shape of the object corresponding to the divided partial data and a position of a vertex forming the selected basic shape data, which corresponds to the vertex, is smaller.

10. The image processing apparatus according to claim 1, wherein
the one or more processors further execute the instructions to
determine whether the selected basic shape data has been modified to the schematic shape of the object corresponding to the divided partial data, and
in a case where the selected basic shape data has not been modified, one of division into the plurality of pieces of partial data, selection of the basic shape data that is modified, and processing to modify the selected basic shape data is performed again.

11. The image processing apparatus according to claim 10, wherein
in a case where modifying has not been performed a predetermined number of times, the data representing the schematic shape of the object is output as three-dimensional shape data of the object.

12. The image processing apparatus according to claim 10, wherein
whether the selected basic shape data has been modified by calculating a difference between the selected basic shape data and the schematic shape of the object corresponding to the divided partial data is determined.

13. An image processing method comprising:
generating data representing a schematic shape of an object;
dividing the generated data into a plurality of pieces of partial data based on a shape of a cross section of the schematic shape of the object;
selecting basic shape data corresponding to the divided partial data from among a plurality of pieces of basic shape data, based on comparison of a cross section of a schematic shape of the object corresponding to the divided partial data and a cross section of a shape of each of the plurality of pieces of basic shape data, a cross-sectional view of the cross section of the shapes of the plurality of pieces of basic shape data being stored as data, the cross section of the schematic shape of the object corresponding to the divided partial data and the stored cross section of the cross-sectional view of the basic shape being compared, and the basic shape data whose degree of matching is higher than a degree of matching of other basic shape data being selected;
modifying the selected basic shape data corresponding to the divided partial data; and
generating three-dimensional shape data of the object based on the modified basic shape data.

14. A non-transitory computer readable storage medium storing a program for causing a computer to perform an image processing method, wherein
the image processing method comprises:
generating data representing a schematic shape of an object;
dividing the generated data into a plurality of pieces of partial data based on a shape of a cross section of the schematic shape of the object;
selecting basic shape data corresponding to the divided partial data from among a plurality of pieces of basic shape data, based on comparison of a cross section of a schematic shape of the object corresponding to the divided partial data and a cross section of a shape of each of the plurality of pieces of basic shape data, a cross-sectional view of the cross section of the shapes of the plurality of pieces of basic shape data being stored as data, the cross section of the schematic shape of the object corresponding to the divided partial data and the stored cross section of the cross-sectional view of the basic shape being compared, and the basic shape data whose degree of matching is higher than a degree of matching of other basic shape data being selected;
modifying the selected basic shape data corresponding to the divided partial data; and
generating three-dimensional shape data of the object based on the modified basic shape data.

* * * * *